United States Patent
Fujisawa

(10) Patent No.: US 12,067,306 B2
(45) Date of Patent: Aug. 20, 2024

(54) PRINTING APPARATUS THAT STORES A DOWNLOADED PORTION OF PRINT DATA, CONTROL METHOD THEREOF, AND STORAGE MEDIUM

(71) Applicant: CANON KABUSHIKI KAISHA, Tokyo (JP)

(72) Inventor: Minoru Fujisawa, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/327,329

(22) Filed: Jun. 1, 2023

(65) Prior Publication Data
US 2023/0409253 A1    Dec. 21, 2023

(30) Foreign Application Priority Data
Jun. 15, 2022 (JP) ................................ 2022-096756

(51) Int. Cl.
*G06F 3/12* (2006.01)

(52) U.S. Cl.
CPC .......... *G06F 3/1218* (2013.01); *G06F 3/1267* (2013.01); *G06F 3/1274* (2013.01); *G06F 3/1287* (2013.01)

(58) Field of Classification Search
CPC .... G06F 3/1218; G06F 3/1267; G06F 3/1274; G06F 3/1287
USPC ........................................................ 358/1.15
See application file for complete search history.

(56) References Cited

U.S. PATENT DOCUMENTS

| | | | |
|---|---|---|---|
| 5,974,232 A | 10/1999 | Kamiya | |
| 8,675,234 B2 | 3/2014 | Sato | |
| 2005/0162693 A1* | 7/2005 | Torii | H04L 41/0213 358/1.15 |
| 2005/0254083 A1* | 11/2005 | Bodart | G06F 3/1204 358/1.15 |
| 2006/0265389 A1* | 11/2006 | Yamahata | G06F 16/162 |
| 2012/0212766 A1 | 8/2012 | Imamoto | |
| 2013/0050739 A1 | 2/2013 | Oshima et al. | |
| 2016/0078332 A1* | 3/2016 | Omodaka | G06K 15/1806 358/1.14 |

(Continued)

FOREIGN PATENT DOCUMENTS

| | | |
|---|---|---|
| JP | 2012133489 A | 7/2012 |
| JP | 2016178611 A | 10/2016 |

OTHER PUBLICATIONS

Extended European search report issued in European Appln. No. 23174615.7, mailed on Oct. 30, 2023.

*Primary Examiner* — Allen H Nguyen
(74) *Attorney, Agent, or Firm* — ROSSI, KIMMS & McDOWELL LLP

(57) ABSTRACT

A printing apparatus includes a receiving unit configured to receive a print job from a print server configured to provide a logical printer, using an Internet Printing Protocol, IPP, a printing unit configured to perform printing based on the print job, and a storage control unit configured to store a downloaded portion of print data specified by the print job, to a storage region. When download of the print data is restarted after download of the print data is canceled, the receiving unit is configured to download a portion of the print data that is not stored in the storage region, using a Hypertext Transfer Protocol, HTTP, range request.

9 Claims, 12 Drawing Sheets

(56) References Cited

U.S. PATENT DOCUMENTS

2018/0267755 A1 9/2018 Okazawa
2019/0303079 A1* 10/2019 Yamada ................ G06F 3/1288

* cited by examiner

| JOB ID 901 | FILE HANDLE 902 | OBTAINED SIZE 903 | TOTAL DATA SIZE 904 | WITHHOLDING START TIME POINT 905 |
|---|---|---|---|---|
| 1234 | File ID1 | 0 | 3582 | 2022/03/18 10:00:10 |
| 1235 | File ID2 | 65535 | 1048575 | 0 |
| 1237 | File ID3 | 262144001 | 524288000 | 2022/03/18 21:45:41 |
| 1240 | File ID4 | 12345 | 12450 | 0 |
| 1245 | File ID5 | 964 | unknown | 2022/03/15 12:21:32 |

FIG. 11A  1100

1101 {
```
GET /share/a.pdf
User-Agent: Canon
Pragma: no-cache
Connection: Keep-alive
Host: 172.24.176.139
Range: bytes=0-65535
```

FIG. 11B  1110

```
HTTP/1.1 200 OK
Date: Sat, 22 Sep 2021 09:42:00 GMT
Server: Canon
Last-Modified: Fri, 21 Sep 2021 09:40:00 GMT
```
1111 { Accept-Range: bytes
1112 { Content-length: 65536
1113 { Content-Range: bytes 0-65535/10485760
```
Connection: Keep-Alive
Keep-Alive: timeout=60, max=1000
Content-Type: text/plain
```
1114 { ⋮

FIG. 12

| START DATE AND TIME | END DATE AND TIME | JOB NAME | STATE | JOB TYPE | JOB OPERATION ||
|---|---|---|---|---|---|---|
| 22/03/18 12:28:30 | 22/03/18 12:30:33 | Aaa | COMPLETE | pdf/LOCAL | — ||
| 22/03/18 12:12:34 | 22/03/18 12:15:28 | Bbb | COMMUNICATION ERROR | PWG-Raster/ CLOUD | CANCEL | PRINT |
| 22/03/18 12:09:01 | 22/03/18 12:09:47 | Ddd | COMPLETE | pdf/LOCAL | — ||
| 22/03/18 10:11:18 | 22/03/18 10:12:21 | Eee | WITHHOLD | pdf/CLOUD | CANCEL | PRINT |

JOB STATUS LIST

RETURN

PRINTING APPARATUS THAT STORES A DOWNLOADED PORTION OF PRINT DATA, CONTROL METHOD THEREOF, AND STORAGE MEDIUM

BACKGROUND OF THE INVENTION

Field of the Invention

The present invention relates to a printing apparatus, a control method thereof, and a storage medium.

Description of the Related Art

Cloud print services that use a cloud have been proposed. Each cloud print service provides a logical printer, and a print job submitted to the logical printer is executed by a physical printer associated with the logical printer (Japanese Patent Laid-Open No. 2012-133489). When a print job is canceled in the physical printer, print data specified by the print job is canceled in the physical printer. Japanese Patent Laid-Open No. 2016-178611 proposes that a receiving apparatus make up for a lost portion of image data transmitted thereto when the image data is discarded. There are cases where, after a print job is canceled in the physical printer, the same print job is executed again. In such a case, if the print data is downloaded again from the beginning, it takes a longer time before print is started, and the communication amount also increases.

SUMMARY OF THE INVENTION

Some aspects of the present disclosure provide a technique for effectively utilizing downloaded print data. According to some embodiments, a printing apparatus comprising: a receiving unit configured to receive a print job from a print server configured to provide a logical printer, using an Internet Printing Protocol, IPP; a printing unit configured to perform printing based on the print job; and a storage control unit configured to store a downloaded portion of print data specified by the print job, to a storage region, wherein, when download of the print data is restarted after download of the print data is canceled, the receiving unit is configured to download a portion of the print data that is not stored in the storage region, using a Hypertext Transfer Protocol, HTTP, range request is provided.

Further features of the present invention will become apparent from the following description of exemplary embodiments with reference to the attached drawings.

BRIEF DESCRIPTION OF THE DRAWINGS

FIG. 9 is a diagram describing an example of download state information according to the first embodiment.

FIGS. 11A and 11B are diagrams describing an example of a packet that is used for communication in the first embodiment.

FIG. 12 is a diagram describing an example of a screen on which results of executing print jobs are displayed according to the first embodiment.

DESCRIPTION OF THE EMBODIMENTS

Figure 1:
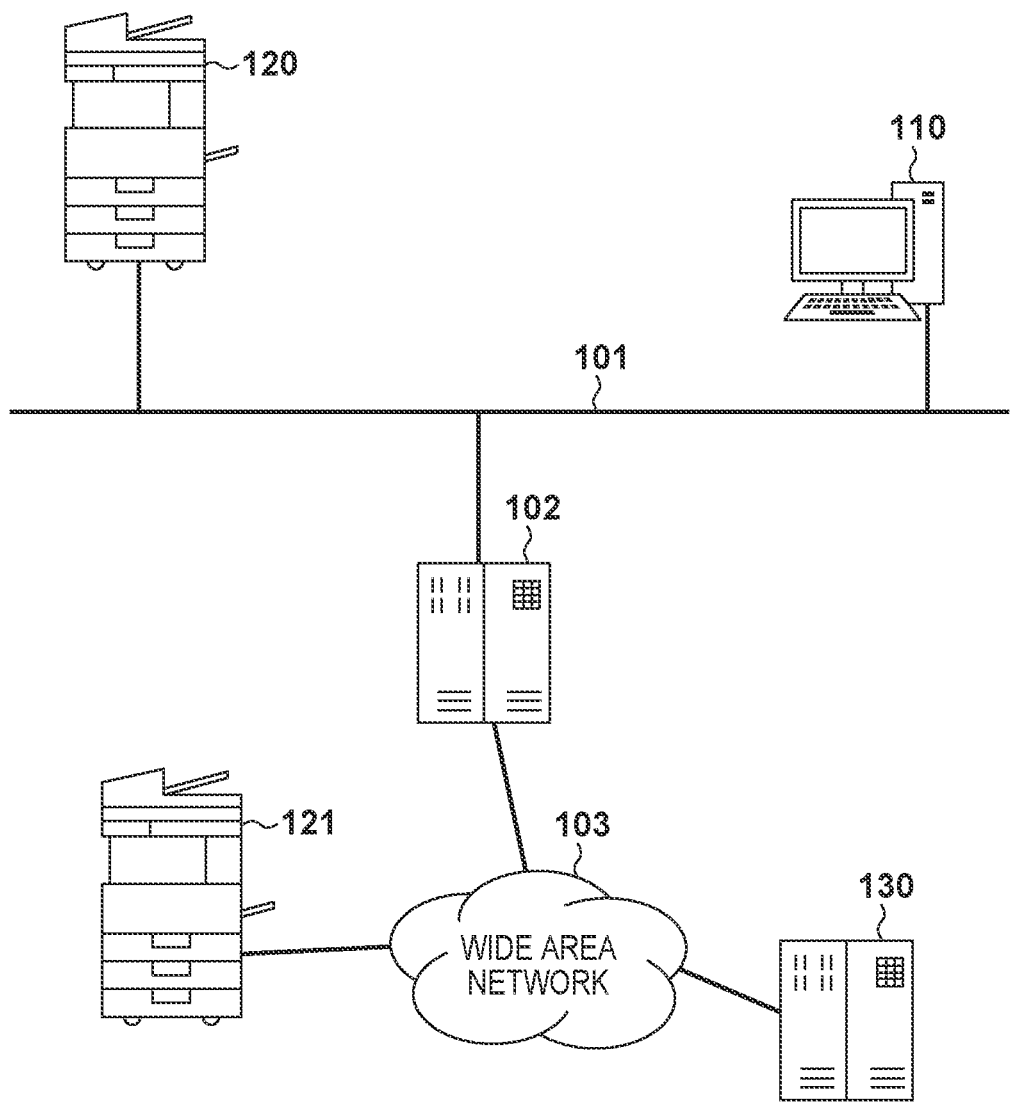
FIG. 1 is a schematic diagram describing an exemplary configuration of a print system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Exemplary Configuration of Print System

An exemplary configuration of a print system according to a first embodiment will be described with reference to FIG. 1. The print system includes an information processing apparatus 110, printing apparatuses 120 and 121, and a print server 130, for example. The number of constituent elements of the print system is not limited to the example in FIG. 1. In addition, the print system may include a constituent element that is not shown in FIG. 1.

The information processing apparatus 110 and the printing apparatus 120 are connected to the same local area network (LAN) 101. The LAN 101 may be a wired LAN or a wireless LAN, or may be a combination thereof. The LAN 101 is connected to a wide area network 103 (for example, the Internet) via a firewall 102. The printing apparatus 121 and the print server 130 are also connected to the wide area network 103. The information processing apparatus 110 and the printing apparatus 120 can communicate with each other within the LAN 101 (that is to say, without using the wide area network 103). In addition, the information processing apparatus 110 and the printing apparatus 120 can communicate with the print server 130 through the LAN 101, the firewall 102, and the wide area network 103. The printing apparatus 121 may be connected to the wide area network 103 through a LAN or a cellular network (for example, a network that complies with the fourth-generation communication standard (4G) or the fifth-generation communication standard (5G)). The information processing apparatus 110 may also be connected to the wide area network 103 through a cellular network.

The printing apparatuses 120 and 121 have a print function of performing printing based on a print job. The printing apparatuses 120 and 121 may have at least one of a scanner function or a facsimile function in addition to the print function. A printing apparatus that has a plurality of functions in this manner may also be referred to as a multifunction printer (MFP). Alternatively, the printing apparatuses 120 and 121 may be dedicated machines (SFPs: Single Function Peripherals) that have the print function only. Printing may be printing that is performed onto a sheet-like recording medium such as paper, or may be formation of a three-dimensional object (so-called three-dimensional printing).

The print server 130 provides a print service for transmitting a print job to any printing apparatus (for example, the printing apparatus 120), in accordance with a print job generated by the information processing apparatus 110. The print server 130 provides a logical printer to the information processing apparatus 110, and accepts a print job for the logical printer, for example. The logical printer is a virtual printing apparatus (for example, a printer object) provided by the print server 130. The logical printer can also be referred to as a "cloud printer". The information processing apparatus 110 can also generate a print queue for the logical printer in a similar manner to the printing apparatuses 120 and 121. Compared with the logical printer, a physical printing apparatus such as the printing apparatus 120 or 121 can also be referred to as a "physical printer". The physical printer can also be referred to as a "local printer" when connected to the same LAN connected to an information processing apparatus that submits a print job. In the following description, the logical printer and the physical printers are simply referred to as "printers" in a collective manner.

The print server 130 may be a server in an on-premise environment connected to the wide area network 103, or may be a server in a cloud computing environment (hereinafter, simply referred to as a "cloud"). A print service that is provided by the print server 130 in the cloud may also be referred to as a cloud print service (hereinafter, referred to as a "CPS"). Universal Print (registered trademark) provided by Microsoft (registered trademark) corporation is an example of the cloud print service. In the following description, a case will be described in which the print server 130 is in a cloud. However, the following description also applies to a case where the print server 130 is in an on-premise environment.

The information processing apparatus 110 provides a print function to the user of the information processing apparatus 110. The information processing apparatus 110 may designate a physical printer (for example, the printing apparatus 120) connected to the sane LAN 101, as an output destination, or may designate a logical printer provided by the print server 130, as an output destination. When the logical printer is designated as an output destination, a physical printer (for example, the printing apparatus 120) associated with the logical printer performs printing. The information processing apparatus 110 that uses CPS may also be referred to as a "client" or a "client terminal". Printing that is performed by submitting a print job to the logical printer can also be referred to as "cloud printing". Printing that is performed through cloud printing may be executed by the printing apparatus 120 connected to the same LAN 101 to which the information processing apparatus 110 is connected, or may also be executed by the printing apparatus 121 that is not connected to the LAN 101. Printing that is performed by directly (that is to say, within the LAN) submitting a print job to a physical printer can be referred to as "local print".

Exemplary Hardware Configuration of Computer

Figure 2:
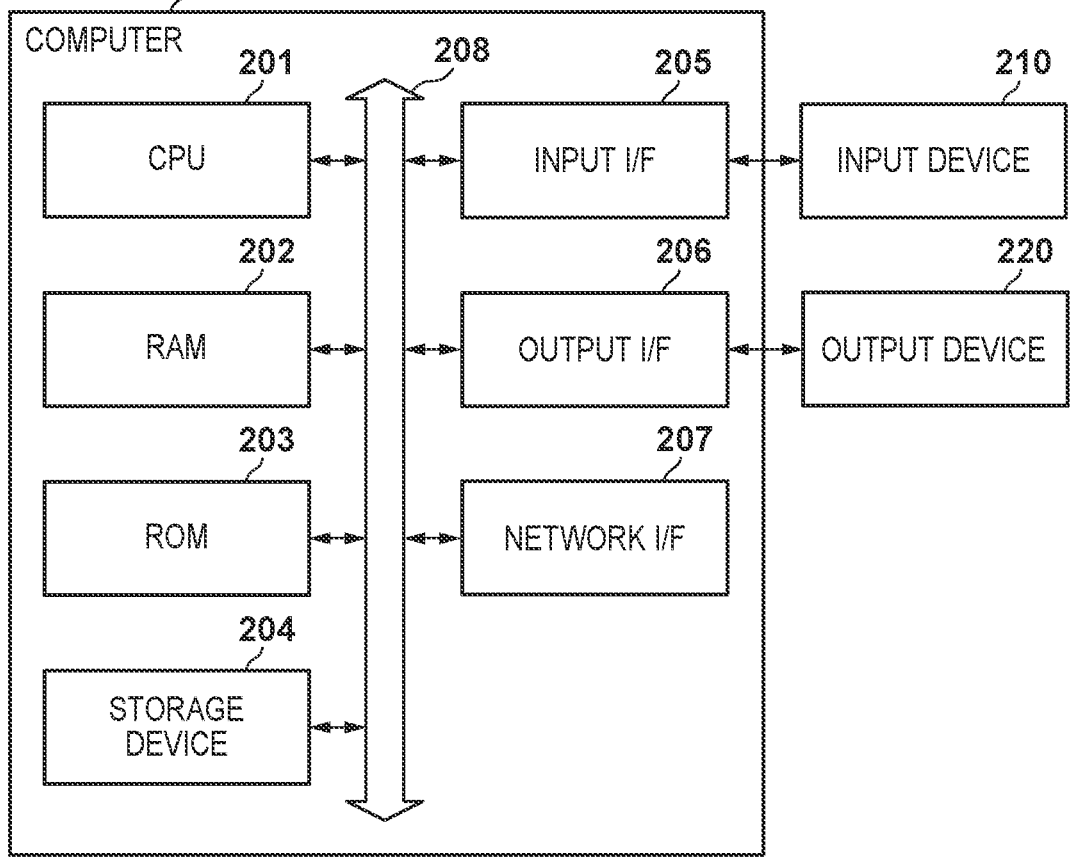
FIG. 2 is a block diagram describing an exemplary hardware configuration of a computer according to the first embodiment.

An exemplary hardware configuration of the computer 200 according to the present embodiment will be described with reference to FIG. 2. The computer 200 may be used as the information processing apparatus 110, or may be used as the print server 130. The computer 200 may include the constituent elements shown in FIG. 2.

A central processing unit (CPU) 201 is a general-purpose processing circuit for controlling overall operations of the computer 200. A random access memory (RAM) 202 is a volatile memory circuit, and is used as a temporary storage region such as a work area for processing that is performed by the CPU 201. A read-only memory (ROM) 203 is a non-volatile memory circuit, and stores programs and data that are used for processing that is performed by the CPU 201. A storage device 204 is a non-volatile storage device, and stores programs and data that are used for processing that is performed by the CPU 201. The storage device 204 may be a hard disk drive (HDD) or a solid state drive (SSD), for example. The storage device 204 may also be referred to as a "secondary storage unit". Operations that are performed by the computer 200 may be realized by the CPU 201 executing programs loaded from the storage device 204 to the RAM 202.

An input interface (I/F) 205 is an OF for transmitting/receiving signals to/from an input device 210. The input device 210 is a device for obtaining input from the user of the computer 200. The input device 210 may be a keyboard, a touch panel, a microphone, a mouse, or any combination thereof, for example. An output I/F 206 is an OF for transmitting/receiving signals to/from an output device 220. The output device 220 is a device for providing information to the user of the computer 200. The output device 220 may be a display, a speaker, or any combination thereof, for example. A network I/F 207 is an OF for communicating with an external apparatus of the computer 200. The CPU 201, the RAM 202, the ROM 203, the storage device 204, the input I/F 205, the output I/F 206, and the network I/F 207 are connected to a system bus 208. In the example in FIG. 2, the input device 210 and the output device 220 are illustrated as devices different from the computer 200. Alternatively, the computer 200 may include the input device 210 and the output device 220.

Exemplary Functional Configuration of Print Server

Figure 3:
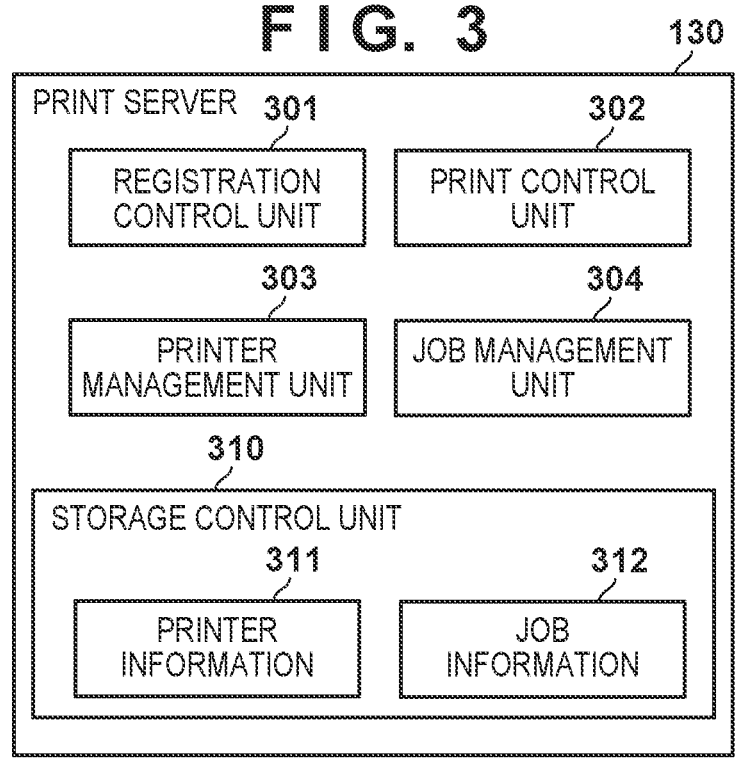
FIG. 3 is a block diagram describing an exemplary functional configuration of a print server according to the first embodiment.

An exemplary functional configuration of the print server 130 will be described with reference to FIG. 3. The print server 130 may include the functional units shown in FIG. 3. The print server 130 may include a functional unit that is not shown in FIG. 3. The functional units in FIG. 3 may be realized by the CPU 201 executing programs loaded to the RAM 202. Alternatively, some or all of the functional units in FIG. 3 may be realized by a dedicated processing circuit such as an application specific integrated circuit (ASIC).

A registration control unit 301 performs processing for registering a logical printer. The registration control unit 301 generates a logical printer associated with a physical printer in accordance with a registration start request from a printing apparatus, and registers the generated logical printer in printer information 311, for example. The logical printer registered in the printer information 311 is recognized as a printer by the information processing apparatus 110. The physical printer associated with the logical printer may be a physical printer that performs printing in accordance with a print job submitted to the logical printer. The logical printer may be associated with only one physical printer. The physical printer may be associated with only one logical printer, or may be associated with a plurality of logical printers.

A print control unit 302 performs processing related to a print job for the logical printer. The print control unit 302 receives a print job for the logical printer, from the information processing apparatus 110, and based on this, transmits the print job to the physical printer associated with the logical printer, for example. In addition, the print control unit 302 may control an event related to the print job. An event related to a print job may include receiving a print job, for example. In response to an event request received from the physical printer, the print control unit 302 may return an event related to the physical printer.

A printer management unit 303 manages information related to the logical printer registered in the print server 130, as the printer information 311. The printer information 311 includes capability information of the physical printer associated with the logical printer, a cloud printer ID uniquely allocated to the logical printer, information regarding a print queue in which a print job is spooled, and the like.

A job management unit 304 manages information regarding a print job received from the information processing apparatus 110, as job information 312. The job information 312 includes information regarding a print job and the state of the print job, print data specified by the print job, and the like.

A storage control unit 310 stores information to the RAM 202 or the storage device 204, and reads out information from the RAM 202 or the storage device 204, in accordance with an instruction from another functional unit. According to the present embodiment, the storage control unit 310 stores the printer information 311 and the job information 312.

Exemplary Functional Configuration of Information Processing Apparatus

Figure 4:
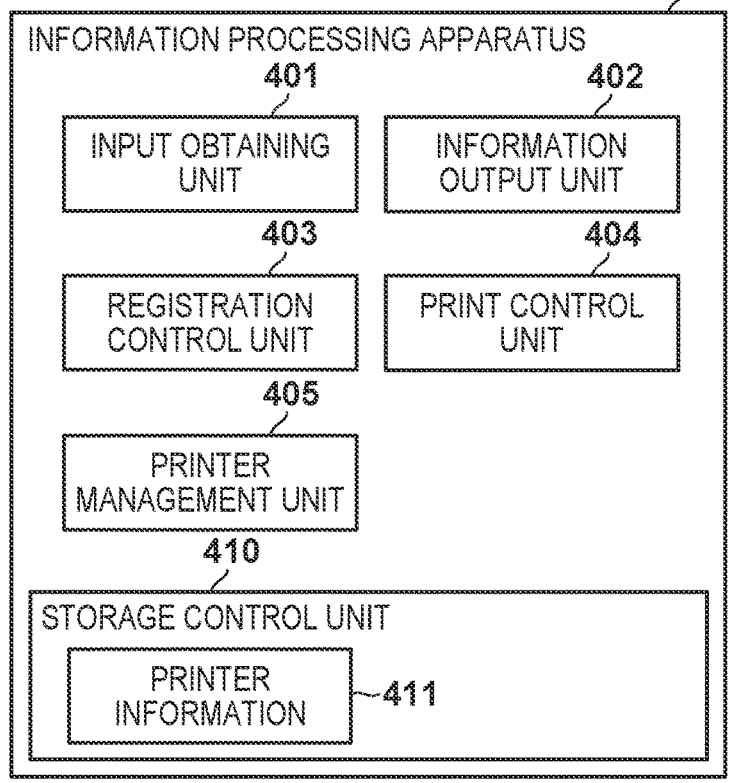
FIG. 4 is a block diagram describing an exemplary functional configuration of an information processing apparatus according to the first embodiment.

An exemplary functional configuration of the information processing apparatus 110 will be described with reference to FIG. 4. The information processing apparatus 110 may include the functional units shown in FIG. 4. The information processing apparatus 110 may include a functional unit that is not shown in FIG. 4. The functional units in FIG. 4 may be realized by the CPU 201 executing programs loaded to the RAM 202. Alternatively, some or all of the functional units in FIG. 4 may be realized by a dedicated processing circuit such as an ASIC.

An input obtaining unit 401 obtains input from the user of the information processing apparatus 110 using the input I/F 205. An information output unit 402 outputs information to the user of the information processing apparatus 110 using the output I/F 206.

A registration control unit 403 performs processing for registering a logical printer to the print server 130. A print control unit 404 performs processing related to printing that is performed by a printer. The print control unit 404 may transmit a print job to the logical printer registered in the print server 130, in accordance with a print instruction from the user of the information processing apparatus 110, for example. The print control unit 404 may transmit a print job directly (that is to say, in the same LAN) to a physical printer in accordance with a print instruction from the user of the information processing apparatus 110.

A printer management unit 405 manages information regarding a printer to which the information processing apparatus 110 can submit a print job, as printer information 411. The printer information 411 includes capability information of the printer and the like.

A storage control unit 410 stores information to the RAM 202 or the storage device 204 and reads out information from the RAM 202 or the storage device 204 in accordance with an instruction from another functional unit. According to the present embodiment, the storage control unit 410 stores the printer information 411.

Exemplary Hardware Configuration of Printing Apparatus

Figure 5:
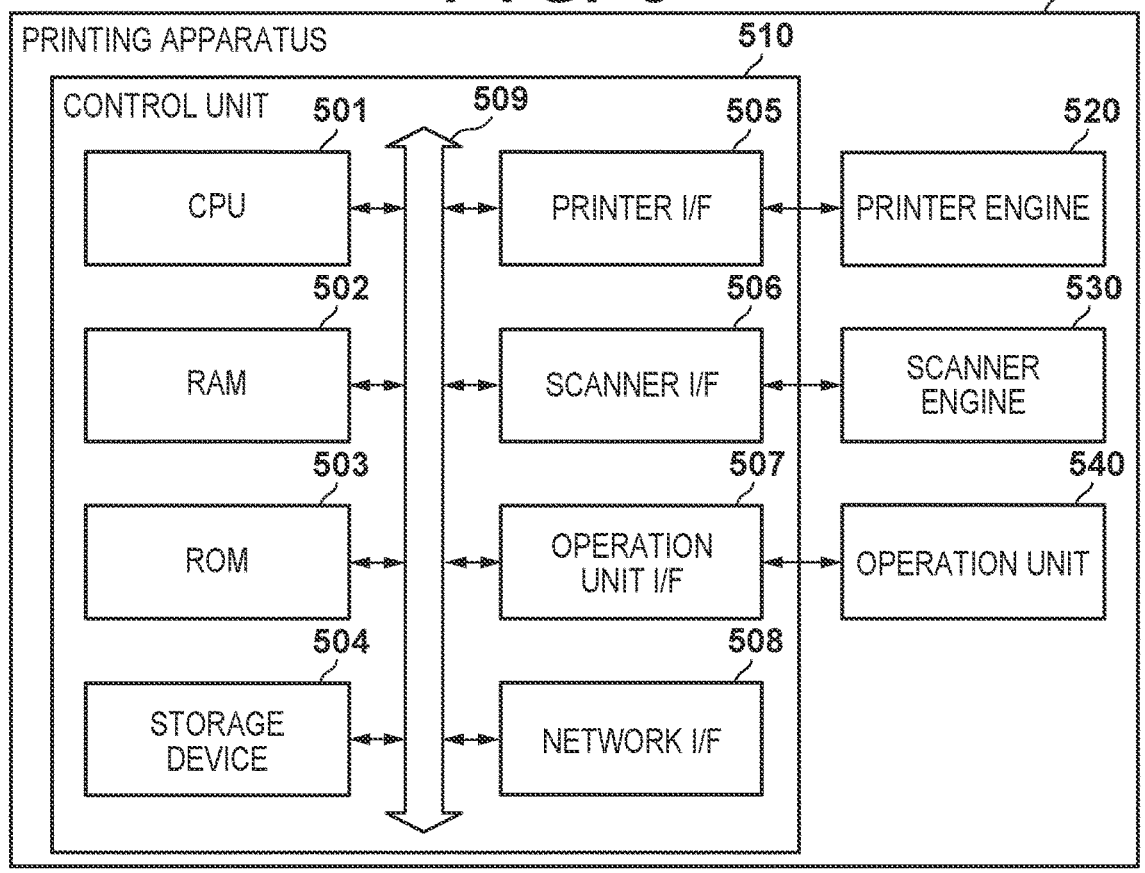
FIG. 5 is a block diagram describing an exemplary hardware configuration of a printing apparatus according to the first embodiment.

An exemplary hardware configuration of a printing apparatus 500 according to the present embodiment will be described with reference to FIG. 5. The printing apparatus 500 may be used as the printing apparatus 120, or may be used as the printing apparatus 121. The printing apparatus 500 may include the constituent elements shown in FIG. 5. The printing apparatus 500 is a physical printing apparatus, and thus is also referred to as a "physical printer".

A CPU 501 is a general-purpose processing circuit for controlling overall operations of the printing apparatus 500. A RAM 502 is a volatile memory circuit, and is used as a temporary storage region such as a work area for processing that is performed by the CPU 501. A ROM 503 is a non-volatile memory circuit, and stores programs and data used for processing that is performed by the CPU 501. A storage device 504 is a non-volatile storage unit, and stores programs and data that are used for processing that is performed by the CPU 501 (for example, a print job, image data, and setting information). The storage device 504 may be an HDD or an SSD, for example. The storage device 504 may also referred to as a "secondary storage unit". Operations that are performed by the printing apparatus 500 may be realized by the CPU 501 executing programs loaded from the storage device 504 to the RAM 502.

A printer I/F 505 is an OF for transmitting/receiving signals to/from a printer engine 520. The printer engine 520 performs printing based on a signal (for example, image signals or a print command) supplied from a control unit 510 through the printer I/F 505. Printing may be electrophotographic printing in which toner is transferred onto paper and is fixed, may be inkjet printing that is performed by discharging ink to paper, or may be three-dimensional printing.

A scanner I/F 506 is an OF for transmitting/receiving signals to/from a scanner engine 530. The scanner engine 530 supplies signals (for example, image signals) obtained by reading a document, to the control unit 510 via the scanner I/F 506. The CPU 501 may process the image signals supplied from the scanner engine 530, and supply record image signals obtained as a result of the processing, to the printer engine 520. In addition, the CPU 501 may generate image data based on the image signals supplied from the scanner engine 530, and transmit the generated image data to an external apparatus.

An operation unit I/F 507 is an I/F for transmitting/receiving signals to/from an operation unit 540. The operation unit 540 is a device that obtains input from the user of the printing apparatus 500, and provides information to the user of the printing apparatus 500. The operation unit 540 may be a display panel (for example, a liquid crystal display), a speaker, a touch panel, a keyboard, buttons, or a touch screen, or may be constituted by any combination thereof, for example.

A network I/F 508 is an I/F for communicating with an external apparatus of the printing apparatus 500. The control unit 510 is constituted by the CPU 501, the RAM 502, the ROM 503, the storage device 504, the printer I/F 505, the scanner I/F 506, the operation unit I/F 507, and the network I/F 508. The constituent elements included in the control unit 510 are connected to a system bus 509.

Exemplary Functional Configuration of Printing Apparatus

Figure 6:
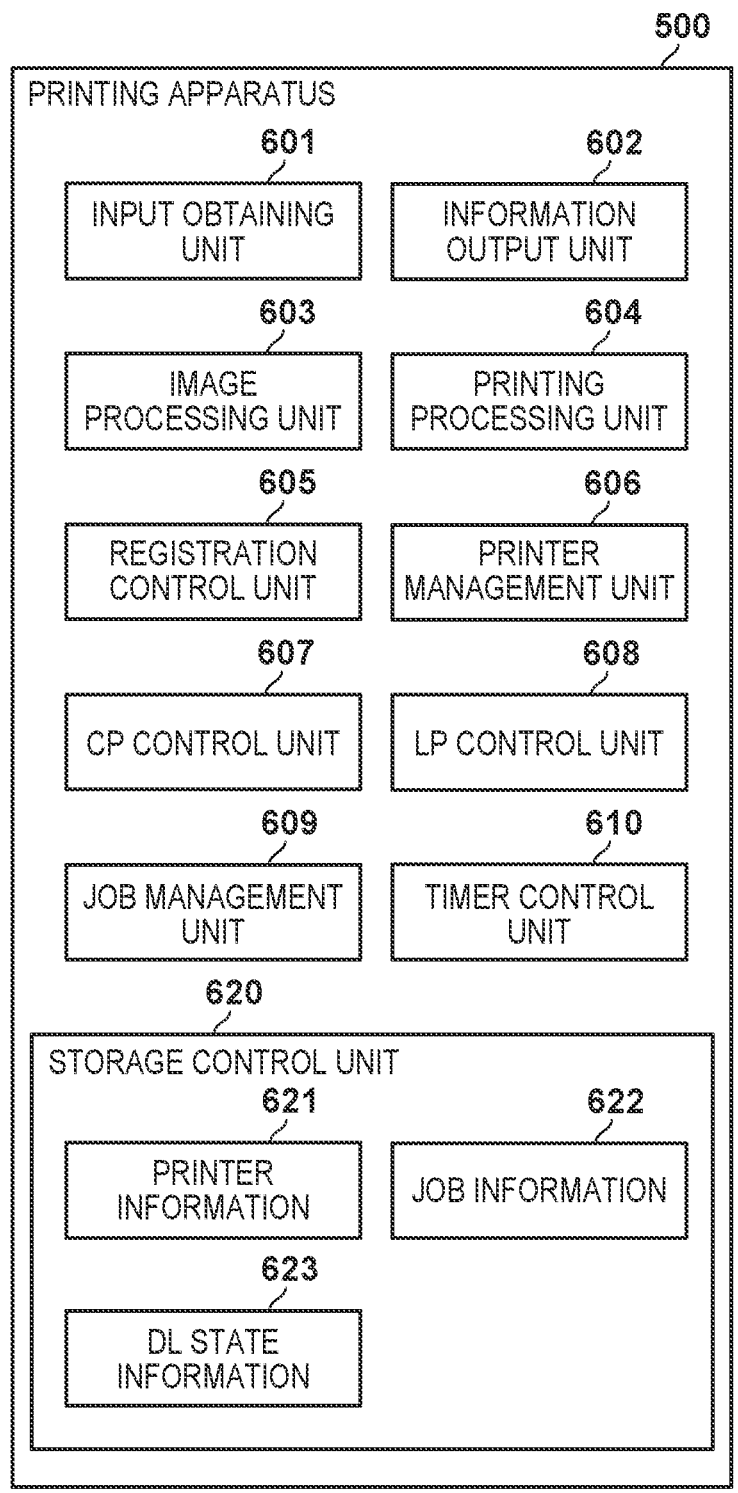
FIG. 6 is a block diagram describing an exemplary functional configuration of the printing apparatus according to the first embodiment.

An exemplary functional configuration of the printing apparatus 500 will be described with reference to FIG. 6. The printing apparatus 500 may include the functional units shown in FIG. 6. The printing apparatus 500 may include a functional unit that is not shown in FIG. 6. The functional units in FIG. 6 may be realized by the CPU 501 executing programs loaded to the RAM 502. Alternatively, some or all of the functional units in FIG. 6 may also be realized by a dedicated processing circuit such as an ASIC.

An input obtaining unit 601 obtains input from the user of the printing apparatus 500 using the operation unit I/F 507. An information output unit 602 outputs information to the user of the printing apparatus 500 using the operation unit I/F 507. An image processing unit 603 renders a print job to produce printing image data. A printing processing unit 604 prints the image data obtained by the image processing unit 603 rendering the print job.

A registration control unit 605 performs processing for registering a logical printer associated with the printing apparatus 500 to the print server 130. A printer management unit 606 manages information regarding the printing apparatus 500 as printer information 621. The printer information 621 may include, for example, the state of the printing apparatus 500, the capability of the printing apparatus 500, and a cloud printer ID uniquely allocated by the print server 130 to the logical printer associated with the printing apparatus 500. In addition, the printer information 621 may include local printer IDs for the information processing apparatus 110 to identify printing apparatuses within the same LAN 101.

A cloud print (CP) control unit 607 performs processing related to cloud printing. The CP control unit 607 may transfer print data received from the print server 130, to the image processing unit 603, for example. In addition, the CP control unit 607 may transmit an event request to the print server 130.

A local print (LP) control unit 608 performs processing related to local printing. The LP control unit 608 may respond to a printer search performed by the information processing apparatus 110, for example. In addition, the LP control unit 608 may transfer print data received directly from the information processing apparatus 110, to the image processing unit 603.

A job management unit 609 manages information regarding a print job as job information 622. The job information 622 may include a processing state and processing result of the print job. Furthermore, the job management unit 609 manages information regarding the state of download of print data specified by the print job, as download (DL) state information 623. The DL state information 623 will be described later in detail.

A timer control unit 610 performs time-related control. The timer control unit 610 may perform notification in accordance with expiration of a set timer, and respond to an inquiry about a current time made by a functional unit of the printing apparatus 500, for example. The timer may be able to be set in units of seconds, for example.

A storage control unit 620 stores information to the RAM 502 or the storage device 504 and reads out information from the RAM 502 or the storage device 504 in accordance with an instruction from another functional unit. According to the present embodiment, the storage control unit 620 stores the printer information 621, the job information 622, and the DL state information 623. The storage control unit 620 may manage data as a file system. The storage control unit 620 may sort pieces of data into the storage device 504 that is a non-volatile region and the RAM 502 that is a volatile region. The storage control unit 620 may store the printer information 621 and the job information 622 to the non-volatile region, for example.

Overall Processing Sequence of Cloud Printing

Figure 7:
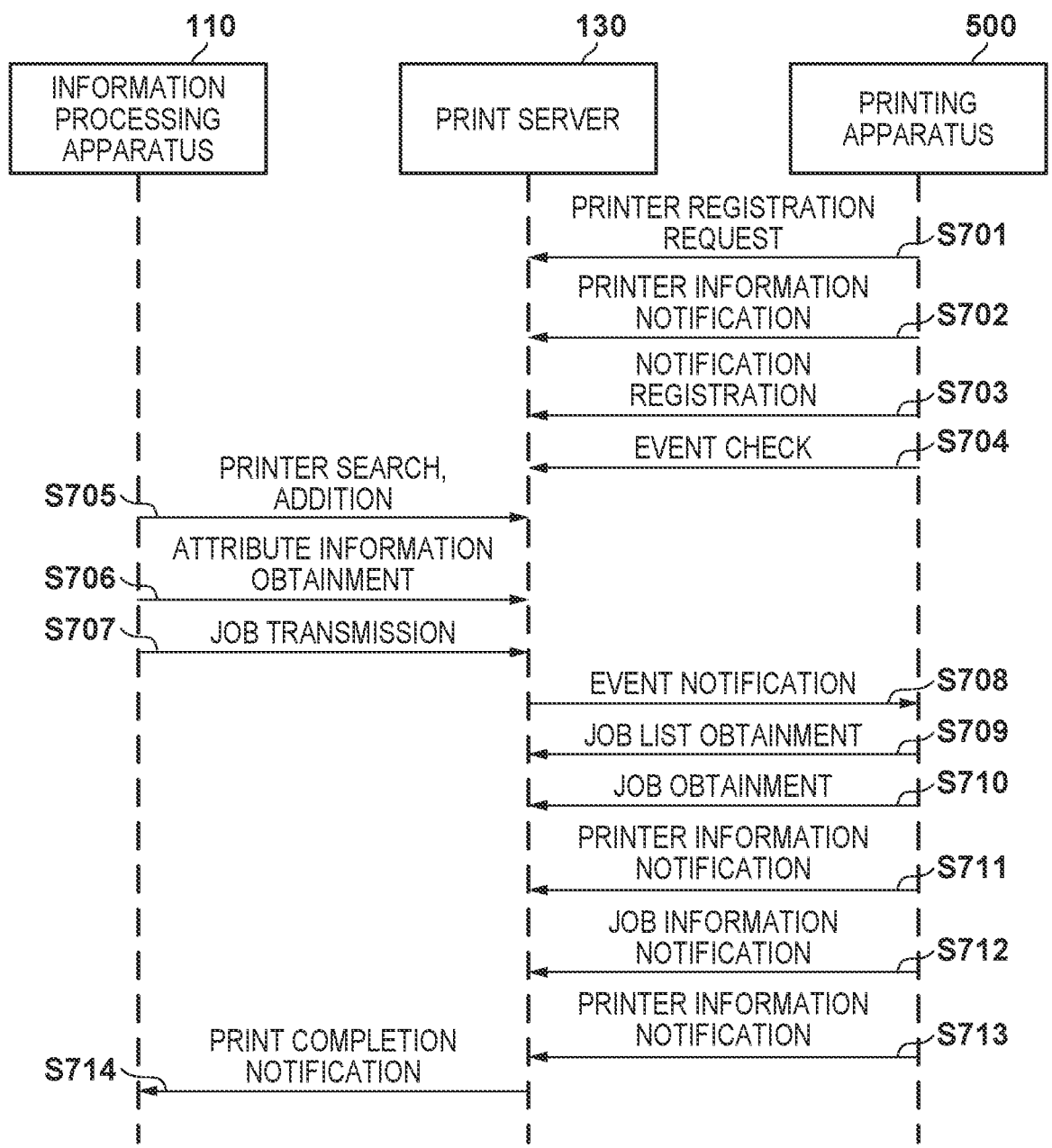
FIG. 7 is a sequence diagram describing overall processing of cloud printing according to the first embodiment.

A sequence of overall processing for performing cloud printing will be described with reference to FIG. 7. The example in FIG. 7 illustrates a case where the printing apparatus 500 is registered in the print server 130, and a print job is submitted from the information processing apparatus 110 to a logical printer associated with the printing apparatus 500. Registering the printing apparatus 500 to the print server 130 may be registering the logical printer associated with the printing apparatus 500 to the print server 130. The printing apparatus 500 may be the printing apparatus 120 in FIG. 1, for example, or may be the printing apparatus 121. Communication may be performed using Internet Printing Protocol (IPP). IPP is stipulated in PWG5100.18, RFC3995, RFC3996, and the like.

In step S701, the registration control unit 605 of the printing apparatus 500 transmits a printer registration request to the print server 130 in order to request that the printing apparatus 500 be registered in the print server 130, in accordance with an instruction from the user, for example. The registration control unit 301 of the print server 130 registers the logical printer associated with the printing apparatus 500 to the print server 130, in response to this request.

In step S702, the CP control unit 607 of the printing apparatus 500 transmits a printer information notification to the print server 130, in order to perform notification of attribute information and attribute values supported by the printing apparatus 500. The printer information notification may be transmitted using the Update-Output-Device-Attributes operation of IPP. The printer management unit 303 of the print server 130 reflects information notified using the printer information notification, on the printer information 311.

In step S703, the CP control unit 607 of the printing apparatus 500 subscribes to event notifications of the print server 130. Event notification subscription may be performed using the Create-Printer-Subscription operation of IPP. In step S704, the CP control unit 607 of the printing apparatus 500 transmits an event check request to the print server 130 in order to check occurrence of an event related to the printing apparatus 500. The event check request may be transmitted using the Get-Notification operation of IPP.

In step S705, the printer management unit 405 of the information processing apparatus 110 searches for a logical printer registered in the print server 130, for example, in accordance with an instruction from the user, and adds a discovered logical printer to the information processing apparatus 110. In step S706, the printer management unit 405 of the information processing apparatus 110 obtains attribute information and attribute values of the added logical printer, and reflects these on the printer information 411. The attribute information and attribute values of the logical printer may be obtained using the Get-Printer-Attributes operation of IPP.

In step S706, the print control unit 302 of the information processing apparatus 110 transmits, to the print server 130, a print job for which a logical printer provided by the print server 130 is set as a target, in accordance with print attributes specified by the user. The print job may be transmitted using the Send-Document operation, the Print-Job operation, or the Create-Job operation of IPP, or the like.

In step S708, the print control unit 302 of the print server 130 transmits an event notification to the printing apparatus 500, in accordance with the print job being received. The event notification may be transmitted using the Notification operation of IPP. In step S709, the CP control unit 607 of the printing apparatus 500 obtains a job list related to the printing apparatus 500 from the print server 130, in accordance with the event notification being received. The job list may be obtained using the Get-Jobs operation of IPP.

In step S710, the CP control unit 607 of the printing apparatus 500 obtains a print job (for example, a print job specified by the user) from one or more print jobs in the job list. The print job may be obtained using the Fetch-Job operation of IPP. The print job may include print data and print settings (for example, attribute values).

The printing processing unit 604 of the printing apparatus 500 performs printing in accordance with the print job in response to the print job being received. In steps S711 and S713, the CP control unit 607 of the printing apparatus 500 performs notification of printer information in accordance with the processing state of the print job. Notification of the printer information may be performed using the Update-Output-Device-Attributes operation of IPP. In step S711, for example, "printer-state=processing" may be transmitted as an attribute value, and, in step S713, "printer-state=idle" may be transmitted as an attribute value. In addition, in step S712, the CP control unit 607 of the printing apparatus 500 performs notification of the job information in accordance with the processing state of the print job. Notification of the job information may be performed using the Update-Job-Status operation of IPP. In step S712, for example, "job-state=completed" may be transmitted as an attribute value. In step S714, the print control unit 302 of the print server 130 transmits a print completion notification to the information processing apparatus 110 in accordance with the printing apparatus 500 completing printing.

Operation Flow of Processing for Downloading Print Data

An example of processing in which the printing apparatus 500 downloads print data from the print server 130 will be described with reference to FIG. 8. The operation in FIG. 8 may be started in accordance with the printing apparatus 500 receiving the print job in step S710 in FIG. 7. The printing apparatus 500 may execute the operation in FIG. 8 every time it receives one print job. In the following description, the print job received from the printing apparatus 500 in step S710 is referred to as a "target job".

In step S801, the CP control unit 607 of the printing apparatus 500 determines whether or not any target job record is included in the DL state information 623. If it is determined that a target job record is included in the DL state information 623 (YES in step S801), the CP control unit 607 advances the procedure to step S802, and otherwise (NO in step S801) advances the procedure to step S804.

A specific example of the DL state information 623 will be described with reference to FIG. 9. In the example in FIG. 9, the DL state information 623 is stored in a table format. The records in the DL state information 623 represent jobs. The DL state information 623 is stored in a non-volatile region (for example, the storage device 504) of the printing apparatus 500 by the storage control unit 620.

A column 901 shows unique identification information individually allocated to print jobs by the print server 130. The CP control unit 607 may determine whether or not any target job record is included in the DL state information 623, based on whether or not the column 901 includes a job ID of a target job. The column 902 shows file handle values of print data stored in a file system by the storage control unit 620. The storage control unit 620 stores print data indicated by the print jobs, to the file system.

A column 903 shows the data sizes of portions of print data that have already been downloaded. A column 904 shows the total data sizes of the print data. When a total data size is unknown, the value in the column 904 may be "UNKNOWN". A column 905 shows time points when the print jobs entered a withheld state. The column 905 is used in the embodiment below. For this reason, in the present embodiment, the column 905 may be omitted.

If no target job record is included in the DL state information 623, the job management unit 609 of the printing apparatus 500 adds a record indicating a target job to the DL state information 623 in step S802. The column 901 of this record holds the job ID of the target job. The column 902 of this record holds a file handle newly created for print data of the target job by the storage control unit 620. Download has not been started at this point, and thus the column 903 of this record have a value of 0. When the total data size of the print data can be obtained from the print server 130, the column 904 of this record holds the obtained size, and, when the total data size is unknown, the column 904 holds "unknown". Furthermore, the job management unit 609 of the printing apparatus 500 also adds a record indicating a target job to the job information 622.

If it is determined in step S801 that no target job record is included in the DL state information 623, the CP control unit 607 of the printing apparatus 500 starts downloading print data of a target job in step S803. On the other hand, if it is determined in step S801 that a target job record is included in the DL state information 623, the CP control unit 607 of the printing apparatus 500 restarts downloading print data of the target job in step S804. As will be described later, if it is determined in step S801 that a target job record is included in the DL state information 623, at least a portion of print data is stored in the printing apparatus 500. For this reason, the CP control unit 607 restarts downloading remaining data. Downloading may be started or restarted by transmitting an IPP message using the job ID of the received target job.

In step S805, the CP control unit 607 of the printing apparatus 500 determines whether or not download is canceled when the print data is downloaded partially. If it is determined that download is canceled when the print data is downloaded partially (YES in step S805), the CP control unit 607 advances the procedure to step S808, and otherwise (NO step S805) advances the procedure to step S806. Download can be canceled, for example, in accordance with a condition is satisfied, the condition including at least one of an error in communication occurring between the print server 130 and the printing apparatus 500 or a download cancel instruction being given by the user of the printing apparatus 500. When the download speed of print data is low, the user of the printing apparatus 500 can cancel download once, and restart download when the communication band is not busy, or restart download using another communication line, for example.

In step S806, if download of the print data is continued, the CP control unit 607 of the printing apparatus 500 reflects the progress of download on the DL state information 623. Specifically, the CP control unit 607 reflects the size of data that has been download to this point, on the column 903 of the DL state information 623. The data downloaded from the print server 130 is stored in the RAM 502 or the storage device 504 by the storage control unit 620.

In step S807, the CP control unit 607 of the printing apparatus 500 determines whether or not download of the print data has been completed. If it is determined that download has been completed (YES in step S807), the CP control unit 607 ends the processing, and otherwise (NO in step S807) advances the procedure to step S805. In this manner, determination is repeatedly performed as to whether or not download of print data has been canceled, until download of the print data is complete.

Determination as to whether or not download has been completed may be performed based on whether or not the size of downloaded data has reached the total data size of the print data. Alternatively, determination on completion of download may be performed based on whether or not the trailing edge of the data is confirmed in CHUNK communication that is a technique of Hypertext Transfer Protocol (HTTP) communication that is a basis of IPP communication. Furthermore, determination on completion of download may be performed by analyzing downloaded data.

If it is determined that download has been canceled, the CP control unit 607 of the printing apparatus 500 updates, in step S808, the job information 622 so as to indicate that download of the target job has been canceled. In addition, the information output unit 602 of the printing apparatus 500 may notify the user of the printing apparatus 500 that download of the print data has been canceled. In step S809, the storage control unit 620 of the printing apparatus 500 continues to store a downloaded portion of the print data. That is to say, even if download of the print data is canceled, the storage control unit 620 does not delete the downloaded data. In addition, the job management unit 609 retains the target job record in the DL state information 623 without deleting it.

Operation Flow of Processing for Printing Print Data

An example of processing in which the printing apparatus 500 prints print data will be described with reference to FIG. 10. The operation in FIG. 10 may be started in accordance with the printing apparatus 500 receiving a print job in step S710 in FIG. 7. The printing apparatus 500 may execute the operation in FIG. 10, every time one print job is received. In the following description, a print job received from the printing apparatus 500 is referred to as a "target job". The operation in FIG. 10 may be executed in parallel with the operation in FIG. 8, or may be started after the operation in FIG. 8 is complete.

In step S1001, the CP control unit 607 of the printing apparatus 500 instructs the printing processing unit 604 to perform printing based on a target job. In this instruction, the CP control unit 607 may pass a buffer pointer of the RAM 502 where print data is held, as print data to the printing processing unit 604, or may pass a file handle (the column 902) of the file system. When the file handle is passed, the printing processing unit 604 may read out the print data from the file handle using the file handle. At the time of step S1001, download of the print data may or may not be complete.

In step S1002, the printing processing unit 604 of the printing apparatus 500 determines whether or not printing can be performed based on the target job. If it is determined that printing can be performed (YES in step S1002), the printing processing unit 604 advances the procedure to step S1006, and otherwise (NO in step S1002) advances the procedure to step S1003. When, for example, an error such as paper jam, toner shortage, or paper-out is occurring in the printing apparatus 500, it may be determined that printing cannot be performed based on the target job.

In step S1003, the information output unit 602 of the printing apparatus 500 inquires of the user of the printing apparatus 500 about whether or not to cancel printing that is based on the target job. In step S1004, the input obtaining unit 601 of the printing apparatus 500 determines whether or not a cancel instruction to cancel the target job has been obtained from the user of the printing apparatus 500. If it is determined that a cancel instruction has been obtained (YES in step S1004), the input obtaining unit 601 advances the procedure to step S1005, and otherwise (NO in step S1004) advances the procedure to step S1001. If a cancel instruction has not been obtained from the user, the CP control unit 607 of the printing apparatus 500 instructs again, in step S1001, the printing processing unit 604 to perform printing based on with the target job. In this manner, the printing apparatus 500 repeats a print instruction until the error in the printing apparatus 500 is resolved, or the target job is canceled by the user. A print instruction may be given again after a predetermined standby time has elapsed, or in accordance with the error in the printing apparatus 500 having been resolved. When a cancel instruction is obtained from the user, the printing processing unit 604 of the printing apparatus 500 cancels printing that is based on the target job in step S1005.

When printing can be performed based on the target job, the CP control unit 607 of the printing apparatus 500 determines, in step S1006, whether or not download of the print data has been completed. If it is determined that download has been completed (YES in step S1006), the CP control unit 607 advances the procedure to step S1007, otherwise (NO in step S1006) repeats step S1006, and waits until download is complete. Determination as to whether or not download has been completed may be performed using a technique similar to that in step S807. In addition, when step S807 has been completed earlier, the CP control unit 607 may utilize the result in step S1006.

In step S1007, the printing processing unit 604 of the printing apparatus 500 determines whether or not to hold the target job. If it is determined that the target job is to be held (YES in step S1007), the printing processing unit 604 advances the procedure to step S1008, and otherwise (NO in step S1007) advances the procedure to step S1009.

Hold printing is a technique for storing print data in a non-volatile region of the printing apparatus 500 without immediately performing printing upon receiving a print request to the printing apparatus 500, and performing paper discharge processing in accordance with a print instruction given by the user of the printing apparatus 500. Even when hold printing has been designated at the time of start of the method in FIG. 10, if designated hold printing has been canceled at the time of execution of step S1007, it is determined that target job is not to be held.

In step S1008, the printing processing unit 604 of the printing apparatus 500 determines whether or not to cancel reservation of the target job. If it is determined that reservation is to be canceled (YES in step S1008), the printing processing unit 604 advances the procedure to step S1001, and otherwise (NO in step S1008) repeats the procedure to step S1008. In step S1009, the printing processing unit 604 of the printing apparatus 500 performs printing based on the target job.

In step S1010, the CP control unit 607 of the printing apparatus 500 notifies the print server 130 of the state of the target job. Specifically, when the target job is canceled in accordance with a user instruction in step S1005, the CP control unit 607 notifies the print server 130 that the target job has been canceled. This notification may be transmitted as an attribute value "job-state=cancel" using the Update- Job-Status operation of IPP, for example. The job management unit 304 of the print server 130 cancels the print job in accordance with this notification being received, and deletes the print data of the print job from the storage device 204. When printing that is based on the target job is completed in step S1009, the CP control unit 607 notifies the print server 130 that the target job has been completed. This notification may be transmitted as an attribute value "job-state=completed" using the Update-Job-Status operation of IPP, for example. The job management unit 304 of the print server 130 completes the print job in accordance with this notification being received, and deletes the print data of the print job from the storage device 204. By performing notification in step S1010 in this manner, the processing state of the print job is synchronized between the print server 130 and the printing apparatus 500.

In step S1011, whether the target job has been canceled or printing that is based on the target job has been completed, the job management unit 609 of the printing apparatus 500 deletes the target job record from the DL state information 623. In addition, whether the target job has been canceled or printing that is based on the target job has been completed, the storage control unit 620 of the printing apparatus 500 deletes the print data of the target job. When, for example, the target job is canceled in accordance with a user instruction in step S1005, and the target job has not been completely downloaded, the storage control unit 620 deletes the data that has been downloaded to this point. In addition, download of the target job is canceled in accordance with the print job having been canceled. By deleting unnecessary data in this manner, the storage region of the printing apparatus 500 is effectively utilized. In addition, the job management unit 609 of the printing apparatus 500 updates the job information 622 in accordance with the execution state of the print job.

Figure 8:
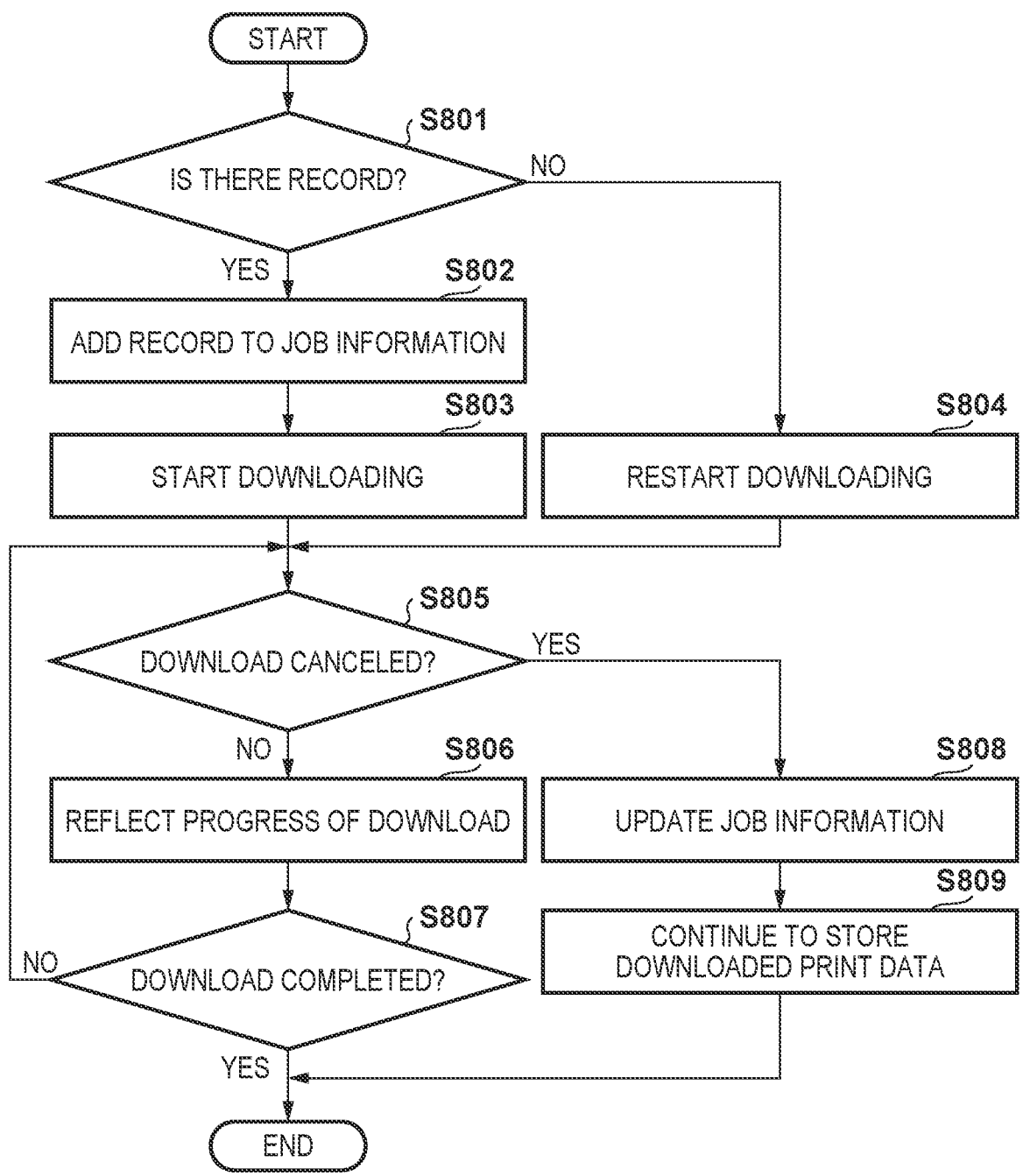
FIG. 8 is a flowchart describing an exemplary operation of processing for downloading print data according to the first embodiment.

When download of the print data is canceled in step S805 in FIG. 8, the printing apparatus 500 does not notify the print server 130 that the target job is to be canceled or the target job is to be completed. For this reason, even when download of the print data is canceled in step S805 in FIG. 8, the print data of the target job remains to be stored in the print server 130. In addition, as described above, even when download of the print data is canceled in step S805 in FIG. 8, a downloaded portion of the print data of the target job remains to be stored also in the printing apparatus 500.

The printing apparatus 500 may execute the operation in FIG. 8 again, on a print job for which download of the print data has been canceled. When, for example, the user instructs the printing apparatus 500 to execute download again, or an error in communication between the print server 130 and the printing apparatus 500 has been resolved, the printing apparatus 500 may execute the operation in FIG. 8 on this print job again. In this case, the printing apparatus 500 can download the remaining portion of the print data, and thus it is possible to shorten a time from when download is executed again until when printing is complete, and the communication amount can be reduced. Also, when a cancel instruction is explicitly obtained from the user as in step S1004, it is possible to effectively utilize the storage capacity of the printing apparatus 500 by deleting print data. Furthermore, also when a print job is in a held state, print data is not deleted.

Packet for Download of Print Data

An example of a packet that is used for download of print data from the print server 130 by the printing apparatus 500 will be described with reference to FIGS. 11A and 11B. IPP is based on HTTP, and thus, in FIGS. 11A and 11B, an HTTP packet will be described as an example. IPP enables an HTTP packet to be transmitted/received.

FIG. 11A shows an example of a packet 1100 that is transmitted to the print server 130 by the printing apparatus 500 in order to download print data. A header of the packet 1100 includes a range field 1101. The range field 1101 is a field for a range request to specify a range of download target within print data. In the example of the packet 1100, a range of 0 to 65535 bytes is specified. When print data is downloaded from the beginning as in step S803 in FIG. 8, such a range is specified. In addition, even for first download, the printing apparatus 500 may specify an offset range.

The range field 1101 can also specify a partial range of print data. For this reason, when remaining print data is downloaded as in step S804 in FIG. 8, the printing apparatus 500 specifies, in the range field 1101, a range excluding a downloaded portion. Accordingly, the printing apparatus 500 can download the remaining portion of the print data (offset the print data).

FIG. 11B shows an example of a packet 1110 that is transmitted to the printing apparatus 500 by the print server 130 as a response to the packet 1100. A header of the packet 1110 includes a field 1111 holding the unit of the size of response data. In addition, the header of the packet 1110 also includes a field 1112 holding the size of data included in a body 1114 of the packet 1110. Furthermore, the header of the packet 1110 includes a field 1113 holding a range of data included in the body 1114 of the packet 1100 and the total size of the data. When the size of print data has not been determined yet, it is possible that the field 1113 has no total size.

The printing apparatus 500 may establish a plurality of HTTP connections with the print server 130, and receive, in parallel, a plurality of packets in which separate offset ranges are set. Accordingly, the speed of download of print data is increased.

Display Screen for Result of Execution of Print Job

An example of a screen 1200 for displaying a result of execution of a print job will be described with reference to FIG. 12. The information output unit 602 of the printing apparatus 500 may generate the screen 1200 in accordance with an instruction from the user and display the generated screen 1200 on the operation unit 540. Alternatively, the information output unit 602 of the printing apparatus 500 may generate the screen 1200 in accordance with a change in the execution state of a print job (for example, after steps S808, S1005, and S1009 are executed), and display the screen on the operation unit 540. The screen 1200 includes information regarding not only a print job related to cloud printing, but also a print job related to local print. The screen 1200 shows the states of print jobs in a table format.

A column 1201 shows the start time and date of printing that is based on each print job. The start time and date may be time and date when the printing apparatus 500 started printing. A column 1202 shows the end time and date of printing that is based on the print job. The end time and date may be time and date when the printing apparatus 500 ended printing. A column 1203 shows the name of a print job represented by each record. This name may be a file name of print data.

A column 1204 shows the state of each print job in the printing apparatus 500. When, for example, download of print data is canceled due to a communication error in step S805 in FIG. 8, "communication error" may be displayed. A column 1205 shows the format of print data and whether the print job is related to cloud printing or local print. A column 1206 shows a user operation that can be executed on the print job. The user can input a cancel instruction (step S1004 in FIG. 10) for the print job by pressing "cancel", for example. The user can execute the print job again by pressing "print". In this case, as described above, when the print data of the print job has been downloaded partially, the remaining portion of the print data is downloaded.

Second Embodiment

A printing apparatus 500 according to a second embodiment will be described. Redundant description of content that may be similar to the printing apparatus 500 according to the first embodiment is omitted. There are cases where there is no non-volatile region that is large enough to store print data, depending on the printing apparatus 500. In addition, even if there is a sufficient non-volatile region, when a large amount of print data remains in the non-volatile region, there can be cases where the non-volatile region cannot be used for downloading new print data. In view of this, in the present embodiment, an upper limit capacity is set for the non-volatile region that can be used for downloading print data, and print data is downloaded so as not to exceed this upper limit capacity.

Operations of the printing apparatus 500 according to the second embodiment will be described with reference to FIG. 12. The printing apparatus 500 according to the second embodiment executes the operation in FIG. 12 in addition to the operation in the first embodiment. The operation in FIG. 12 may also be executed continuously while the printing apparatus 500 is activated. An upper limit capacity is set for the non-volatile region of the printing apparatus 500 that can be used for cloud printing. The upper limit capacity may be set in a fixed manner in accordance with the capacity of the non-volatile region of the printing apparatus 500 (the storage device 504), or may be set in a variable manner based on the capacity of an external storage connected to the printing apparatus 500.

In step S1301, the storage control unit 620 of the printing apparatus 500 permits the non-volatile region to newly store data for cloud printing. In this case, data related to cloud printing such as print data may be stored in the non-volatile region in an unlimited manner.

In step S1302, the storage control unit 620 of the printing apparatus 500 determines whether or not the used capacity of the non-volatile region used for cloud printing exceeds the upper limit capacity. If it is determined that the used capacity of the non-volatile region for cloud printing exceeds the upper limit capacity (YES in step S1302), the storage control unit 620 advances the procedure to step S1303, and otherwise (NO in step S1302) repeats step S1302.

In step S1303, the storage control unit 620 of the printing apparatus 500 prohibits the non-volatile region to newly store data for cloud printing. In this case, data related to cloud printing can be stored in the volatile region (the RAM 502), but cannot be stored in the non-volatile region (the storage device 504). For this reason, print data that is downloaded in steps S803 and S805 in FIG. 8 is stored only in the volatile region, and is not stored in the non-volatile region.

In addition, hold printing is a function that is based on assumption that print data is stored in a non-volatile region, and thus hold printing cannot be executed. For this reason, a print job that instructs hold printing is handled as an error. Regarding a print job whose print data is already stored in the non-volatile region, hold printing may be available continuously.

In step S1304, the storage control unit 620 of the printing apparatus 500 determines whether or not the used capacity of the non-volatile region used for cloud printing is smaller than the upper limit capacity. If it is determined that the used capacity of the non-volatile region used for cloud printing is smaller than the upper limit capacity (YES in step S1304), the storage control unit 620 advances the procedure to step S1301, and otherwise (NO in step S1304) repeats step S1303.

As described above, according to the present embodiment, cloud printing can be efficiently executed based on the capacity of the non-volatile region of the printing apparatus 500.

Third Embodiment

A printing apparatus 500 according to a third embodiment will be described. Redundant description of content that may be similar to the printing apparatus 500 according to the first embodiment is omitted. In addition, the present embodiment may be combined with the second embodiment. In the first embodiment, print data is stored in a storage region until explicitly deleted by the printing apparatus 500. When print data is continuously stored for a long time for hold printing or download restart, the capacity of the storage region cannot be effectively utilized. In view of this, in the present embodiment, an upper limit time is set for a time during which print data is stored, and, when this upper limit time is exceeded, print data is deleted. The upper limit time may be a fixed value, or may be able to be set by the user of the printing apparatus 500.

Figure 13:
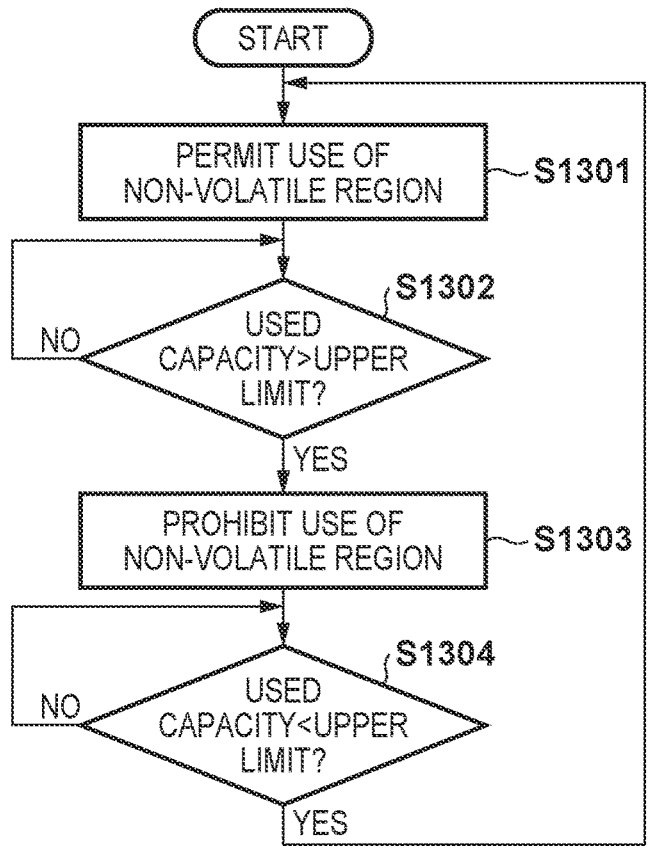
FIG. 13 is a flowchart describing an exemplary operation of a printing apparatus according to a second embodiment.
Figure 14:
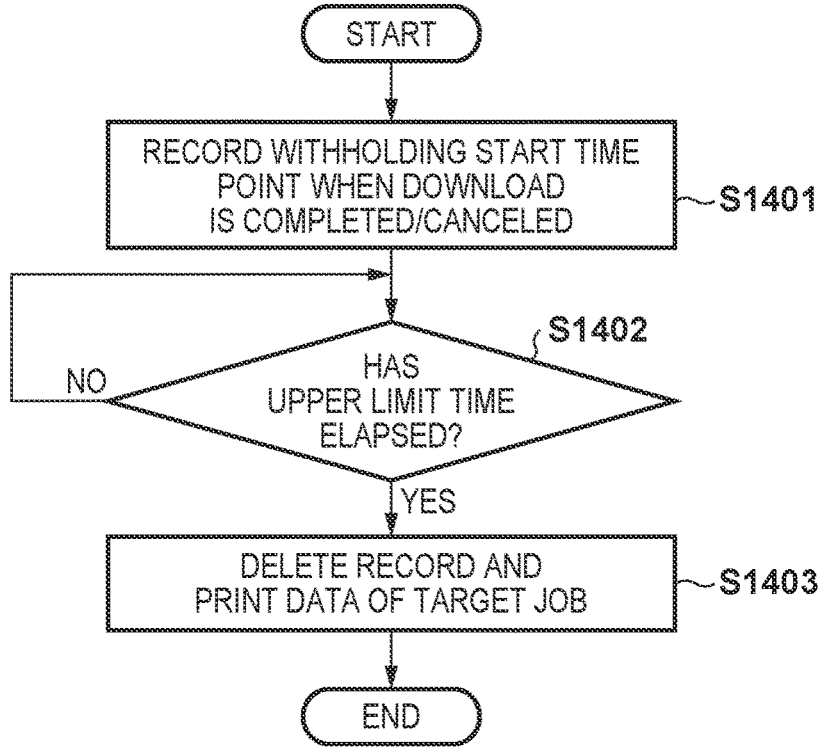
FIG. 14 is a flowchart describing an exemplary operation of a printing apparatus according to a third embodiment.

Operations of the printing apparatus 500 according to the third embodiment will be described with reference to FIG. 13. The printing apparatus 500 according to the third embodiment executes the operation in FIG. 13 in addition to the operations in the first embodiment. The operation in FIG. 13 is executed on a print job for which it is determined in step S807 or S1006 that download of print data has been completed, or a print job for which it is determined in step S805 that download has been canceled. In the following description, such a print job is referred to as a "target job". The printing apparatus 500 may execute the operation in FIG. 13 in parallel on a plurality of print jobs.

In step S1401, the timer control unit 610 of the printing apparatus 500 records a time point at which download of a target print job is completed or canceled, in the column 905 of the DL state information 623. This time point can also be referred to as a "withholding start time point". The print data of the target job may be stored in the non-volatile region of the printing apparatus 500.

In step S1402, the timer control unit 610 of the printing apparatus 500 determines whether or not a time that has lapsed from the withholding start time point has reached the upper limit time. If it is determined that a time that has lapsed from the withholding start time point has reached the upper limit time (YES in step S1403), the timer control unit 610 advances the procedure to step S1403, and otherwise (NO in step S1403) repeats step S1402.

In step S1403, the job management unit 609 of the printing apparatus 500 deletes the target job record from the DL state information 623. Accordingly, the withholding start time recorded in the column 905 is also deleted. In addition, the storage control unit 620 of the printing apparatus 500 deletes the print data of the target job. When an instruction to execute, again, a print job whose print data has been deleted in this manner or to execute hold printing of such a print job is given, the printing apparatus 500 downloads this print data again from the beginning.

As described above, according to the present embodiment, it is possible to effectively utilize the storage region of the printing apparatus 500.

Fourth Embodiment

A printing apparatus 500 according to a fourth embodiment will be described. Redundant description of content that may be similar to the printing apparatus 500 according to the first embodiment is omitted. In addition, the present embodiment may be combined with the second embodiment or the third embodiment. In the first embodiment, when an instruction to cancel a print job is obtained from the user in step S1004 in FIG. 10, print data is deleted in step S1001. Instead, when a cancel instruction is obtained from the user, the printing apparatus according to the present embodiment inquires the user about whether or not to delete the print data.

Figure 15:
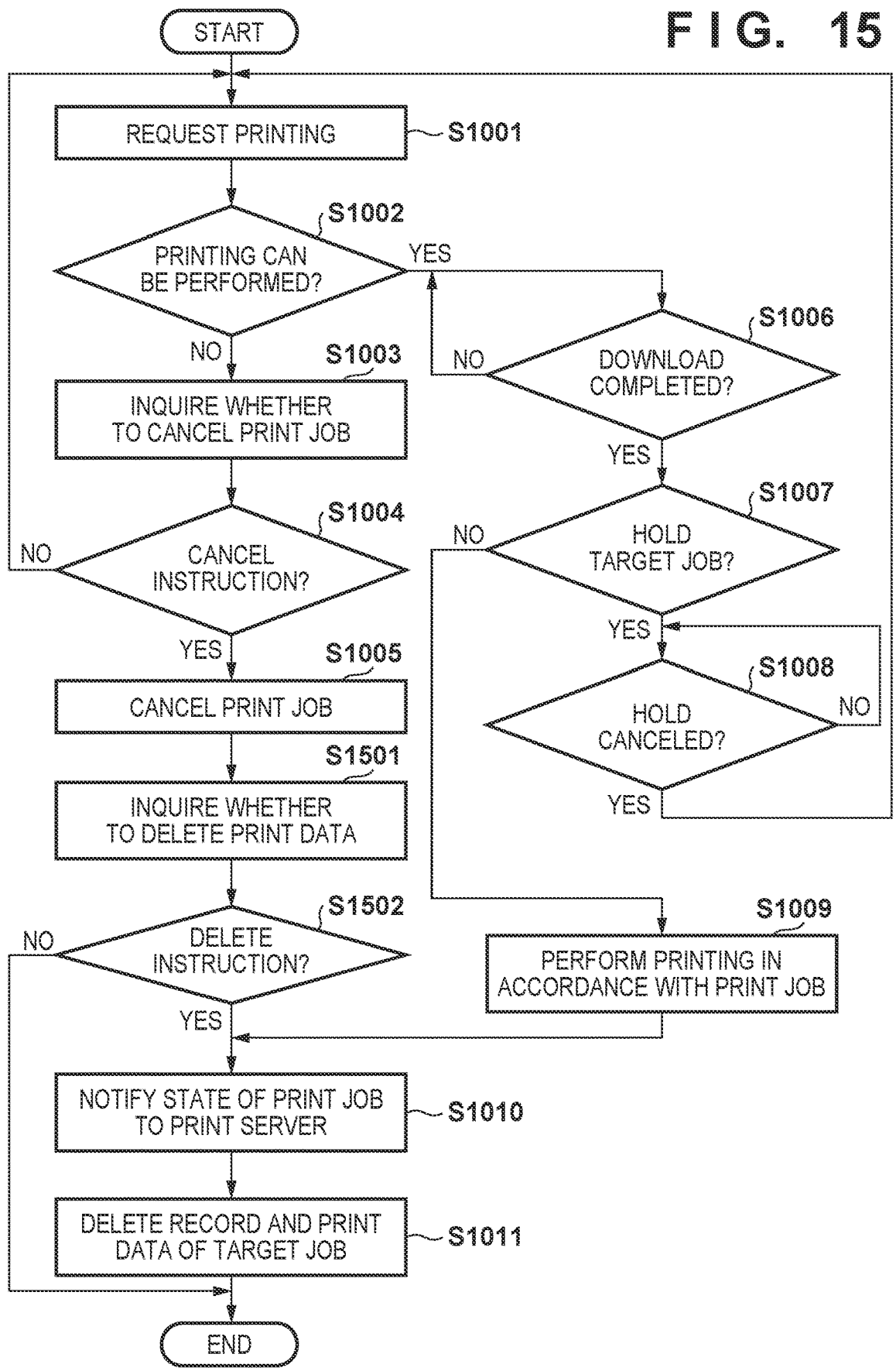
FIG. 15 is a flowchart describing an exemplary operation of a printing apparatus according to a fourth embodiment.

Operations of the printing apparatus 500 according to the fourth embodiment will be described with reference to FIG. 15. This method is different from the method in FIG. 10 in that steps S1501 and S1502 are further provided between steps S1005 and S1010, and other content may be similar.

In step S1501, the information output unit 602 of the printing apparatus 500 inquires the user of the printing apparatus 500 about whether or not to delete a downloaded portion of print data of the target job. In step S1502, the input obtaining unit 601 of the printing apparatus 500 determines whether or not a delete instruction to delete the downloaded portion of the print data has been obtained from the user of the printing apparatus 500. The input obtaining unit 601 advances the procedure to step S1010 if it is determined that a delete instruction has been obtained (Yes in step S1502), and ends the procedure if it is determined that an instruction to maintain the downloaded portion of the print data has been obtained (NO in step S1502).

Figure 10:
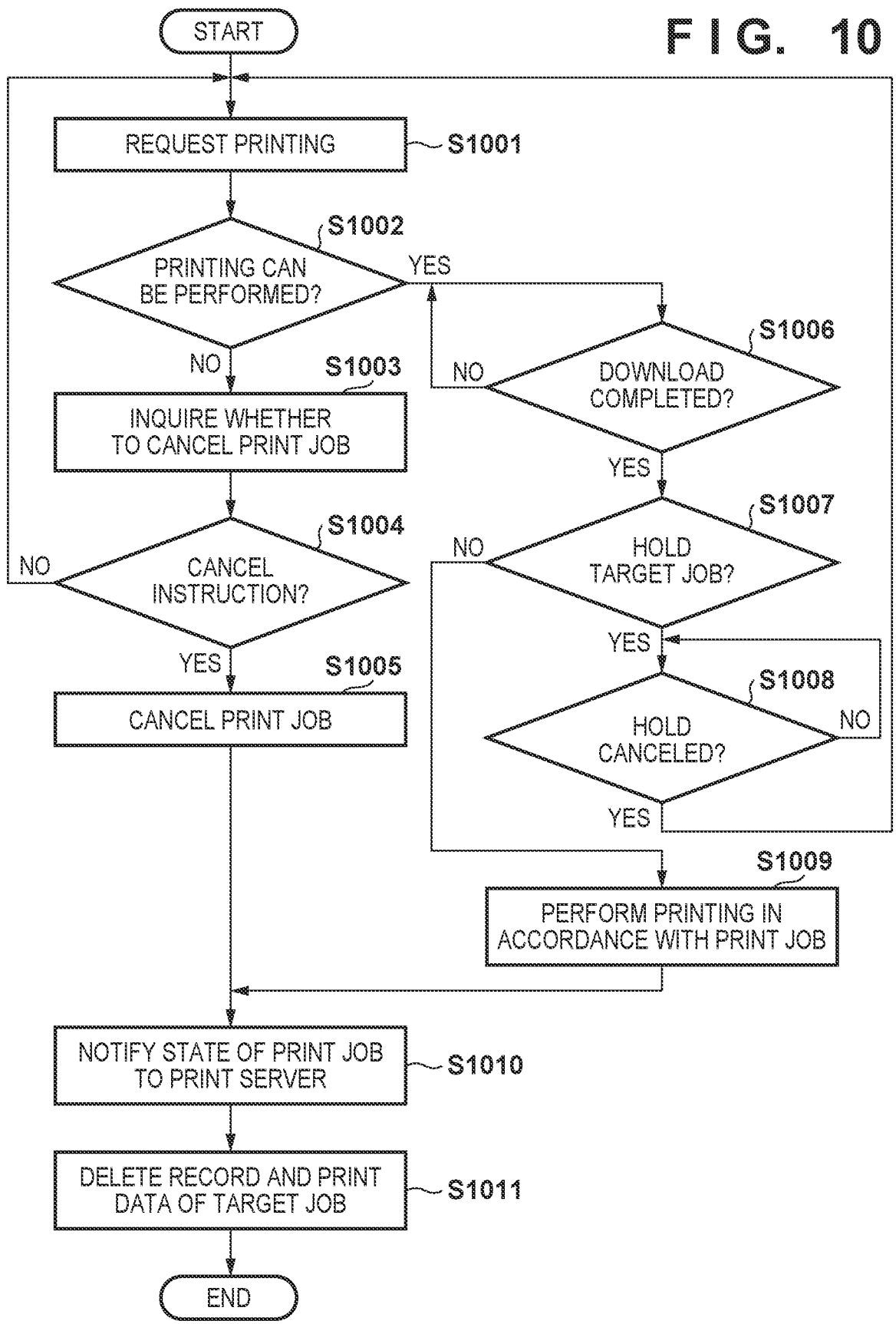
FIG. 10 is a flowchart describing an exemplary operation of processing for printing print data according to the first embodiment.

When a delete instruction is obtained, the printing apparatus 500 executes steps S1010 and S1011 in FIG. 10, thereby deleting the print data in the printing apparatus 500, and causing the print server 130 to delete the print data. On the other hand, if a delete instruction has not been obtained, the printing apparatus 500 does not execute steps S1010 and S1011 in FIG. 10. Accordingly, the print data in the printing apparatus 500 continues to be stored, and the print data in the print server 130 also continues to be stored. Accordingly, when the print job for which this print data is used is executed again, the amount of data that is download is reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-096756, filed Jun. 15, 2022, which is hereby incorporated by reference herein in its entirety.

What is claimed is:

1. A printing apparatus comprising at least one processor circuit and a memory storing instructions, that when executed by the processor circuit, cause the processor circuit to at least:
receive a print job from a print server configured to provide a logical printer, using an Internet Printing Protocol, IPP;
perform printing based on the print job;
store a downloaded portion of print data specified by the print job, to a storage region;
when download of the print data is restarted after download of the print data is canceled, download a portion of the print data that is not stored in the storage region, using a Hypertext Transfer Protocol, HTTP, range request; and
when a time that has lapsed from when the downloaded portion of the print data is stored in the storage region reaches an upper limit time, delete the portion from the storage region.

2. The printing apparatus according to claim 1, wherein the instructions, when executed by the processor circuit, further cause the processor circuit, when the download of the print data is canceled, to continue to store the downloaded portion of the print data to the storage region in a case where a first condition is satisfied, and deletes the downloaded portion of the print data from the storage region in a case where a second condition is satisfied.

3. The printing apparatus according to claim 2, wherein the first condition includes at least one of the download of the print data being canceled due to a communication error, or the download of the print data being canceled in response to an instruction from a user of the printing apparatus, and
the second condition includes the download of the print data being canceled due to the print job being canceled.

4. The printing apparatus according to claim 2, wherein the first condition includes a user of the printing apparatus cancelling the print job and instructing that the downloaded portion of the print data be maintained, and
the second condition includes a user of the printing apparatus cancelling the print job and instructing that the downloaded portion of the print data be deleted.

5. The printing apparatus according to claim 1, wherein the instructions, when executed by the processor circuit, further cause the processor circuit to notify the print server that the print data is to be deleted from the print server, when the downloaded portion of the print data is deleted from the storage region.

6. The printing apparatus according to claim 1, wherein the instructions, when executed by the processor circuit, further cause the processor circuit to delete the print data from the storage region when printing based on the print job is complete.

7. The printing apparatus according to claim 1, wherein
the storage region includes a volatile region and a non-volatile region, and
the instructions, when executed by the processor circuit, further cause the processor circuit to
permit the non-volatile region to newly store data for printing that uses the logical printer, when a used capacity of the non-volatile region used for the printing is smaller than an upper limit capacity, and
prohibit the non-volatile region to newly store data for printing that uses the logical printer, when the used capacity of the non-volatile region used for the printing exceeds the upper limit capacity.

8. A non-transitory computer-readable storage medium comprising a program for causing a computer to function as the printing apparatus according to claim 1.

9. A method for controlling a printing apparatus configured to perform printing based on a print job, the method comprising:
receiving a print job from a print server that provides a logical printer, using an Internet Printing Protocol, IPP;
storing a downloaded portion of print data specified by the print job, to a storage region;
when download of the print data is restarted after download of the print data is canceled, downloading a portion of the print data that is not stored in the storage region, using a Hypertext Transfer Protocol, HTTP, range request; and
when a time that has lapsed from when the downloaded portion of the print data is stored in the storage region reaches an upper limit time, deleting the portion from the storage region.

* * * * *